United States Patent
Ivanov et al.

(10) Patent No.: US 7,907,781 B2
(45) Date of Patent: Mar. 15, 2011

(54) SYSTEM AND METHOD FOR DETERMINING GEOMETRIES OF SCENES

(75) Inventors: Yuri A. Ivanov, Arlington, MA (US); Jay E. Thornton, Watertown, MA (US); Christopher R. Wren, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 928 days.

(21) Appl. No.: 11/766,174

(22) Filed: Jun. 21, 2007

(65) Prior Publication Data

US 2008/0317332 A1  Dec. 25, 2008

(51) Int. Cl.
*G06K 9/48* (2006.01)
(52) U.S. Cl. ......... 382/199; 382/154; 382/254; 382/275; 382/266

(58) Field of Classification Search .................. 382/199, 382/154, 254, 275, 266
See application file for complete search history.

(56) References Cited

U.S. PATENT DOCUMENTS

2007/0109506 A1 * 5/2007 Niesten ............................ 353/70
2008/0279446 A1 * 11/2008 Hassebrook et al. ......... 382/154

* cited by examiner

*Primary Examiner* — Bhavesh M Mehta
*Assistant Examiner* — Mike Rahmjoo
(74) *Attorney, Agent, or Firm* — Dirk Brinkan; Gene Vinokur

(57) ABSTRACT

A method and an apparatus determines a geometry of a scene by projecting one or more output image into the scene, in which a time to project the output image is $t_1$. Input images are acquired of the scene, in which a time to acquire each input image is $t_2$, and in which $t_1 > t_2$ and in which the input image includes a distinguishable stripe of pixels with an edge due to $t_1 > t_2$. An amount of distortion of the edge is measured from a straight line to determine a geometry of the scene.

20 Claims, 10 Drawing Sheets

100

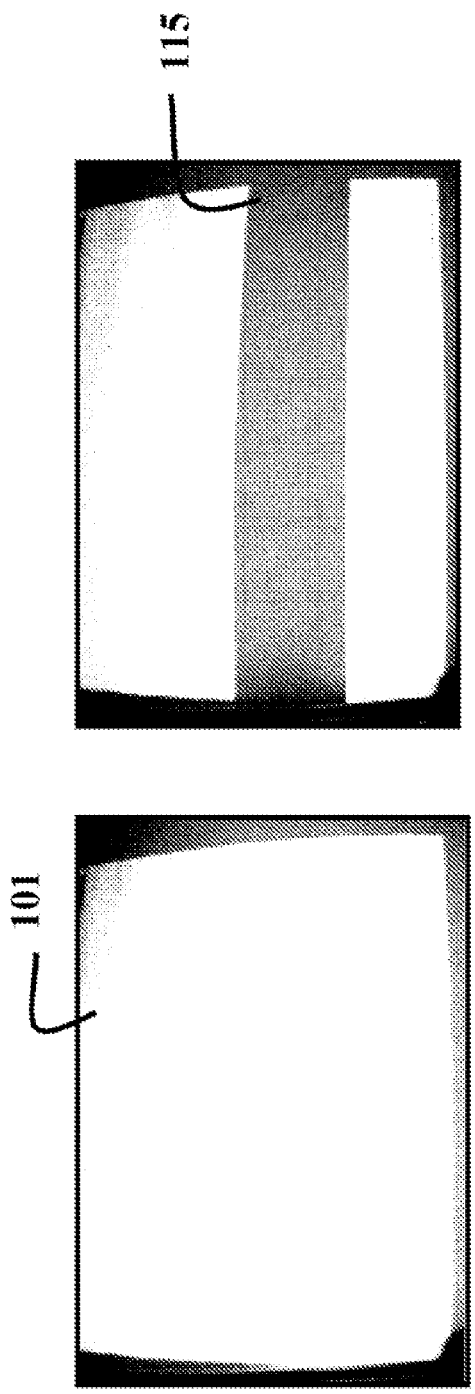
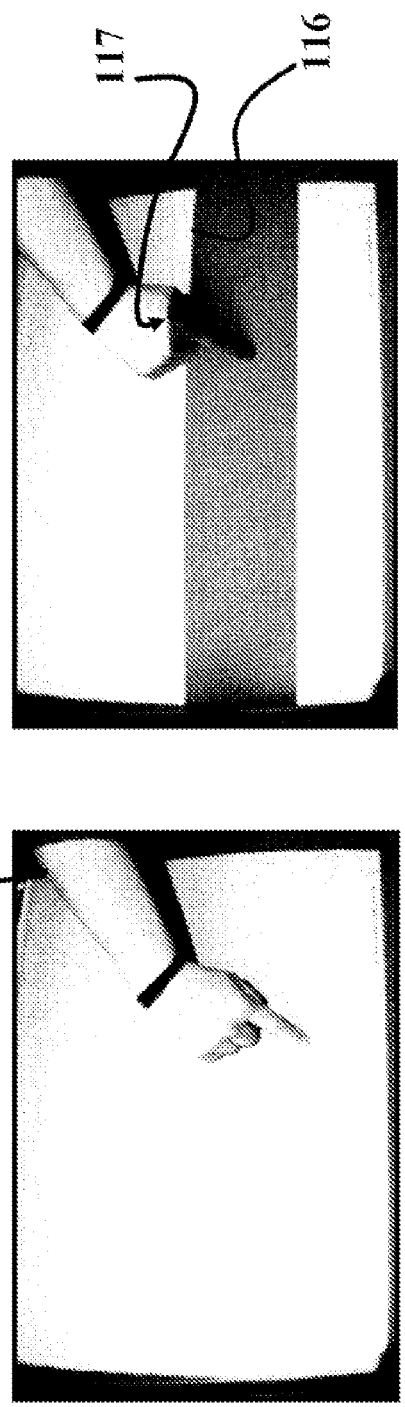
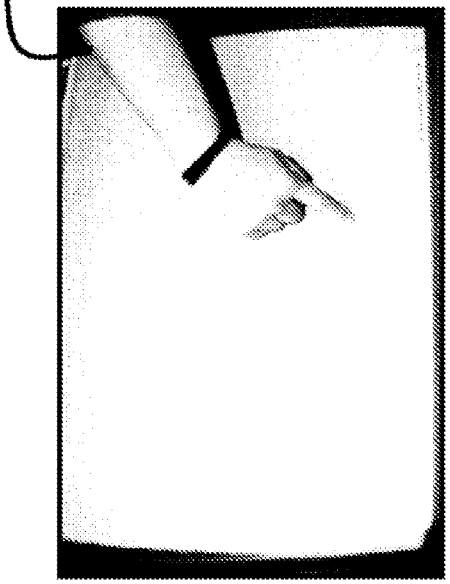
FIG. 3A
FIG. 3B
FIG. 3C
FIG. 3D

SYSTEM AND METHOD FOR DETERMINING GEOMETRIES OF SCENES

FIELD OF THE INVENTION

This invention relates generally to image processing, and more particularly to determining a 3D geometry of a scene using images projected into to the scene, while acquiring input images of the scene.

BACKGROUND OF THE INVENTION

A number of systems and methods are known for determining the 2D or 3D geometry of scene. Typically, this is done with specialized equipment such as ranging devices or stereoscopic cameras.

To determine 3D geometry from monocular images is more difficult. Shape-from-shading techniques assume that the scene has some known reflectance properties, such as Lambertian, Hapke, etc. Structured light is frequently used to determine 3D geometry because it is robust to reflectance and surface geometry. One method for active ranging uses color-coded structured light, K. L. Boyer, A. C. Kak, "Color-encoded structured light for rapid active ranging", IEEE Trans. Pattern Anal. Mach. Intell., 9(1), 1987, pp. 14-28. Another method uses multi-stripe inspection, J. A. Jalkio, R. C. Kim, S. K. Case, "Three dimensional inspection using multistripe structured light," Optical. Engineering, 1.985, pp. 966-974.

The main idea is to project a structured pattern of light with known geometric properties into a scene. Then, an analysis of the distortions induced on the pattern, as seen in images acquired of the scene by a camera, can be used to determine the 3D geometry of the scene, R. J. Valkenburg and A. M. Melvor, "Accurate 3D measurement using a structured light system," Image and Vision Computing, 16(2):99-310, February 1998, D. Scharstein, R. Szeliski, "High-accuracy stereo depth maps using structured light," IEEE Comput. Soc. Conf. on Computer Vision and Pattern Recognition (CVPR03), vol. 1, pp. 195-202, June 2003, and Joaquim Salvi, Jordi Pagès, Joan Batlle. "Pattern codification strategies in structured light systems," Pattern Recognition 37(4): 827-849, 2004.

However, using structured light in user interactive application has problems. The structured light changes the appearance of the scene. Therefore, it is desired to determine 3D geometry using a structured light pattern that is not visible to the user.

SUMMARY OF THE INVENTION

The embodiments of the invention provide a system and method for generating a pattern of structured light using a rasterizing projector and a conventional camera. Although the invention does not project a visible structured light pattern, the effect of the invention is similar to using a structured light pattern. A typical use of the invention is an application for acquiring a geometry of a scene.

The method does not require specialized equipment beside the rasterizing projector to generate the structured light pattern, and a camera to acquired the structured light pattern. Any image can be projected, and structure will be recovered at every pixel with at least some intensity.

The system and method are particularly suited for human computer interaction, cell phones and augmented reality applications, where users interact with displayed images.

BRIEF DESCRIPTION OF THE DRAWINGS

FIGS. 3A-3D are output and input image of the system of FIG. 1;

DETAILED DESCRIPTION OF THE PREFERRED EMBODIMENT

Figure 1:
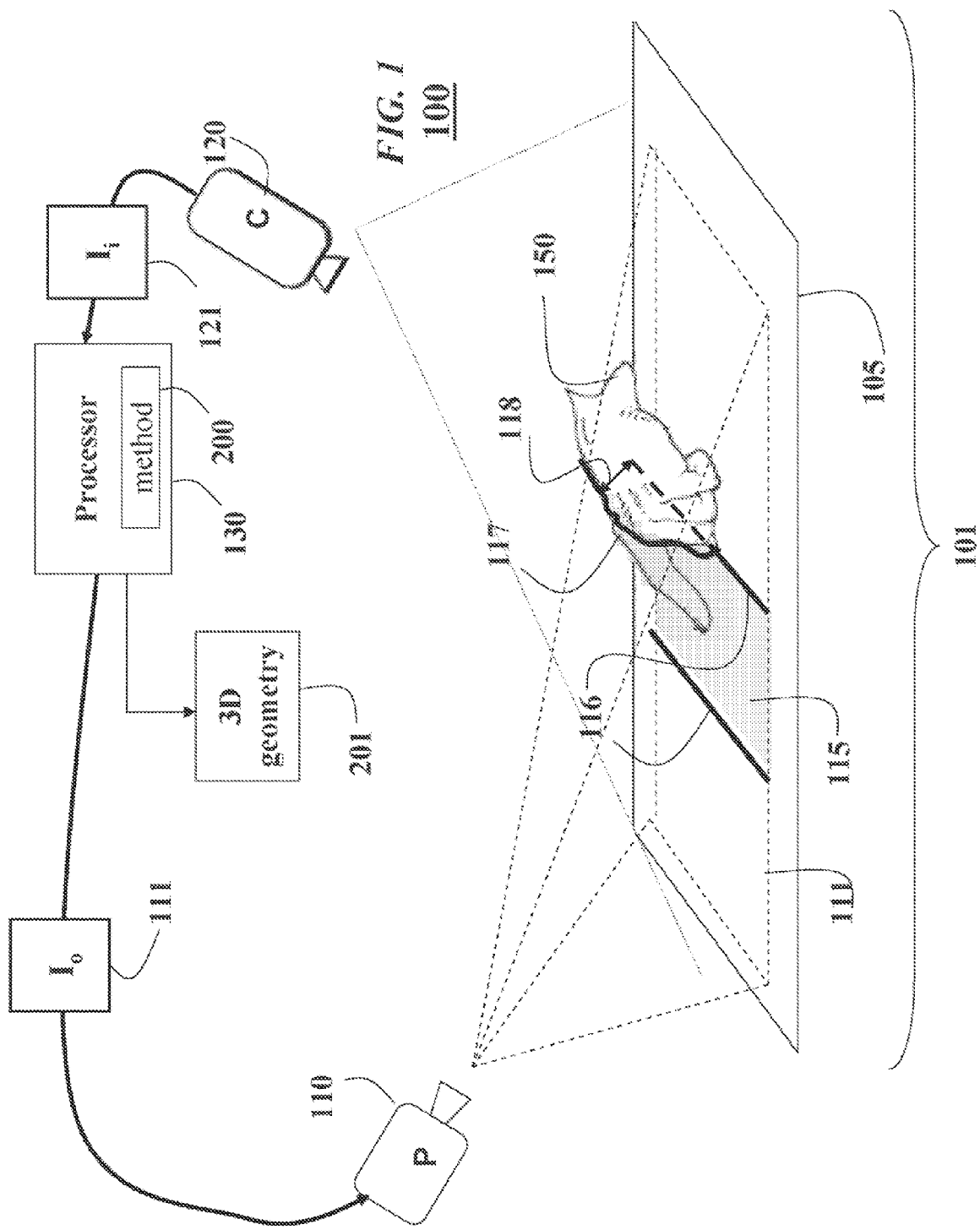
FIG. 1 is a block diagram of a system for determining a geometry of a scene according to an embodiment of the invention.
Figure 2A:
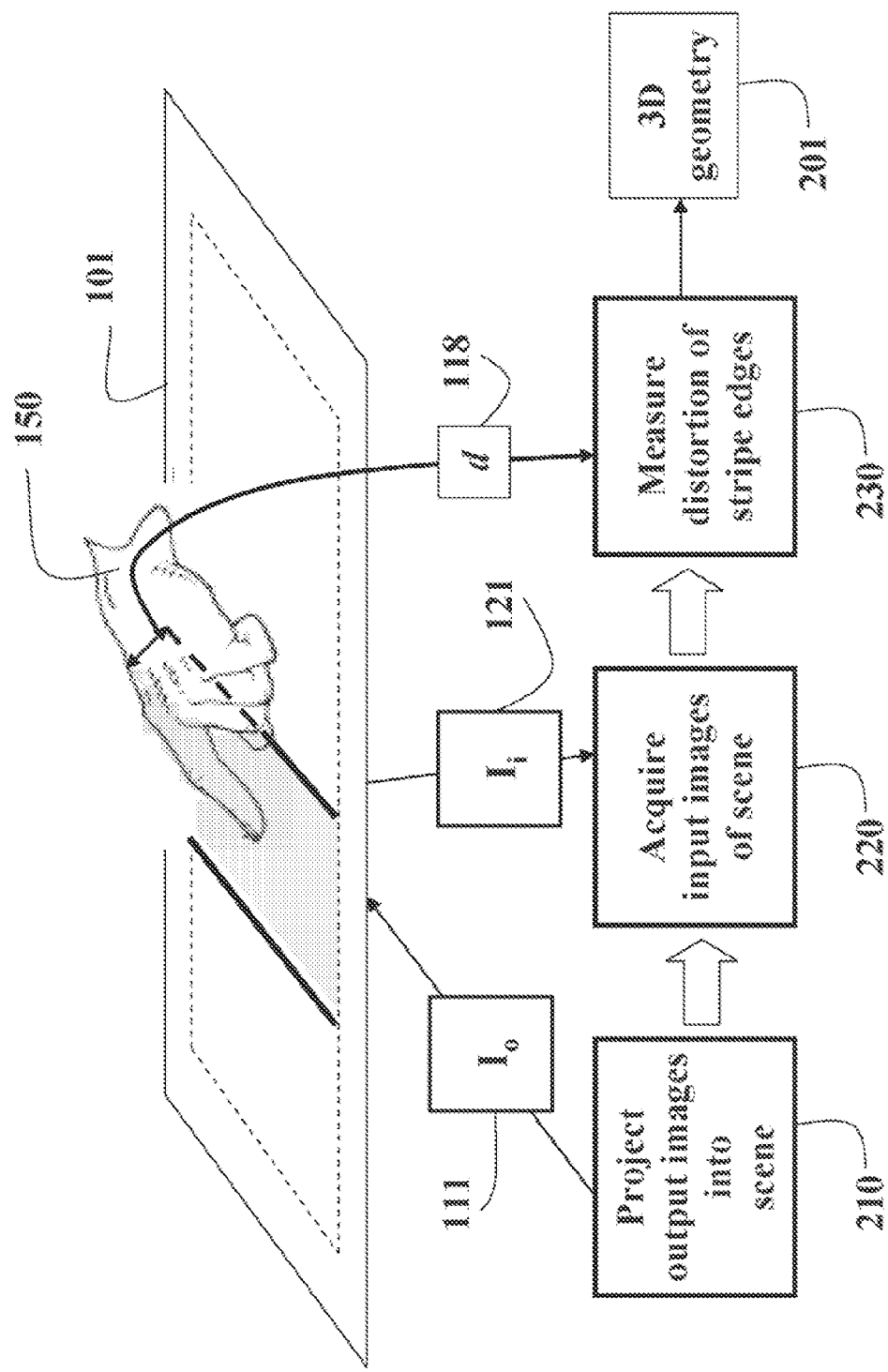
FIG. 2A is flow diagram of a method for determining a geometry of a scene according to an embodiment of the invention.

FIGS. 1-2 shows a system 100 and method 200 for generating a pattern of light into a scene 101 to determine a geometry of the scene according to embodiments of our invention. The geometry can be 2D (a surface profile) or a full 3D geometry of the surface structure of the scene. A projector 110 projects 210 a sequence of output images $I_o$ 111 onto a display surface 105 in a scene 101 at a first rate $R_1$, while a camera 120 acquires 220 a sequence of input images $I_i$ 121 of the scene at a second rate $R_2$. For reasons described below, the rate $R_1$ is different: than the rate $R_2$, although this is not required for acquiring a simple 2D geometry. The projector employs rasterization techniques.

In addition, a time to project a single output image 111 is $t_1$, and a time to acquire a single input image is $t_2$, such that $t_1 > t_2$. It should also be realized that the camera shutter is closed part of the time in between acquiring successive images, if the camera has an electronic shutter, a similar effect is observed in that the integration of light at the sensors is intermittent. For some cameras, the integration can be controlled on a pixel or row basis.

Figure 5:
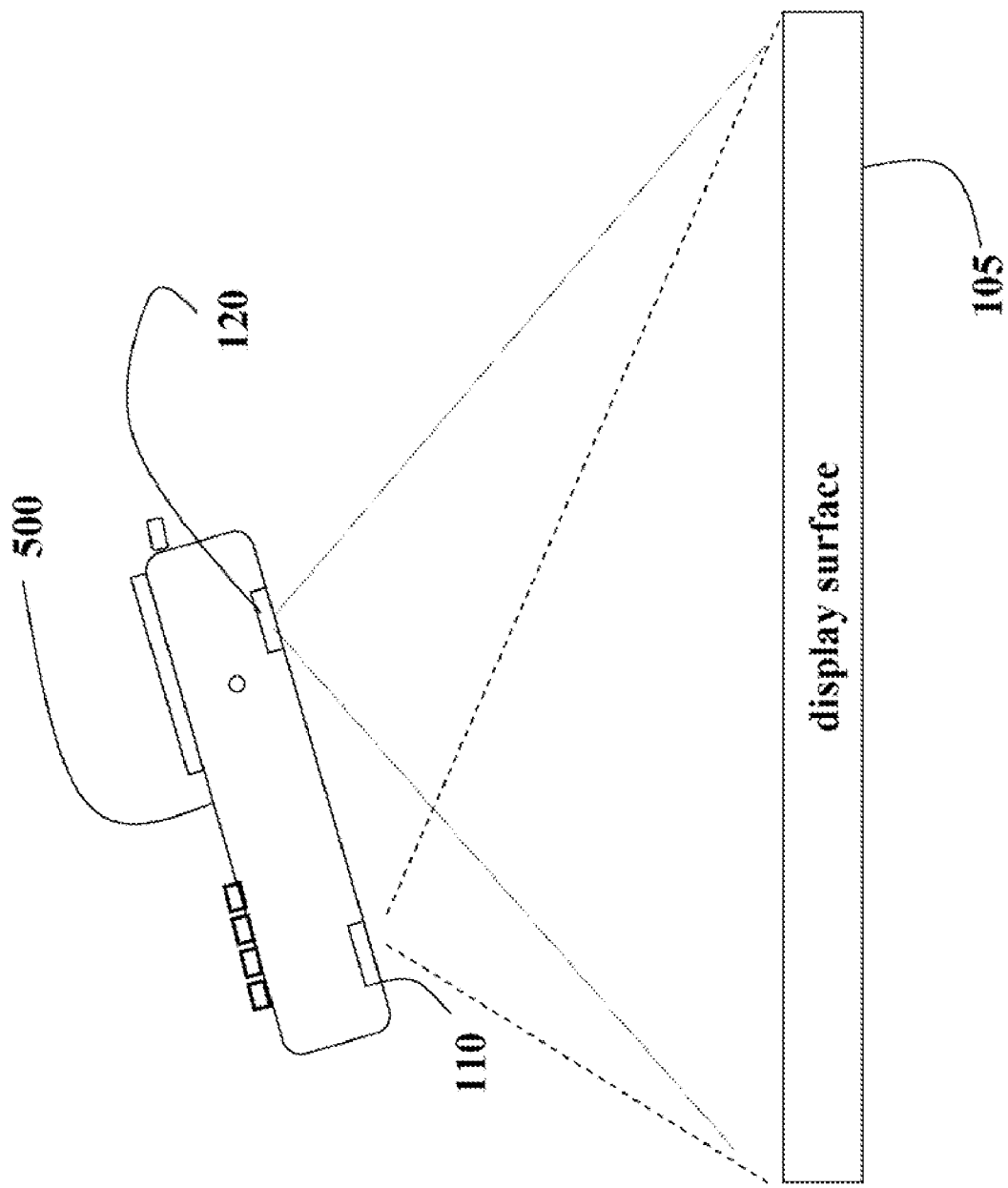
FIG. 5 is a block diagram of an embodiment of the invention using a mobile telephone.

The projector 110 and camera 120 can be connected to a processor 130, which performing the method 200 according to an embodiment of the invention. The processor can be a conventional as found in a desktop or laptop computer, or a microprocessor, in one embodiment as shown in FIG. 5, the processor, camera and microprocessor are embedded in a handheld mobile telephone 500.

The method 200 generates the output images 111, and processes the input images 121 to determine the geometry 201 of the scene 101. The geometry can be used in interactive application, such as tabletop games and computer graphic presentations.

The output images 111 are unrestricted any can be arbitrary. It is emphasized that we do not project structured light pattern, as in the prior art, although our effect: is similar. A goal of tire method 200 is to project an imperceptible pattern of structured light: onto the 3D scene, such that its geometry can be extracted. For example, the scene can include a 3D object. In one embodiment, the object is a hand 150 of user, or some other pointing device. Thus, it possible to track the user's hand, and other objects in the scene in real-time. This can have numerous applications in computer graphics and computer vision applications.

Figure 2B:
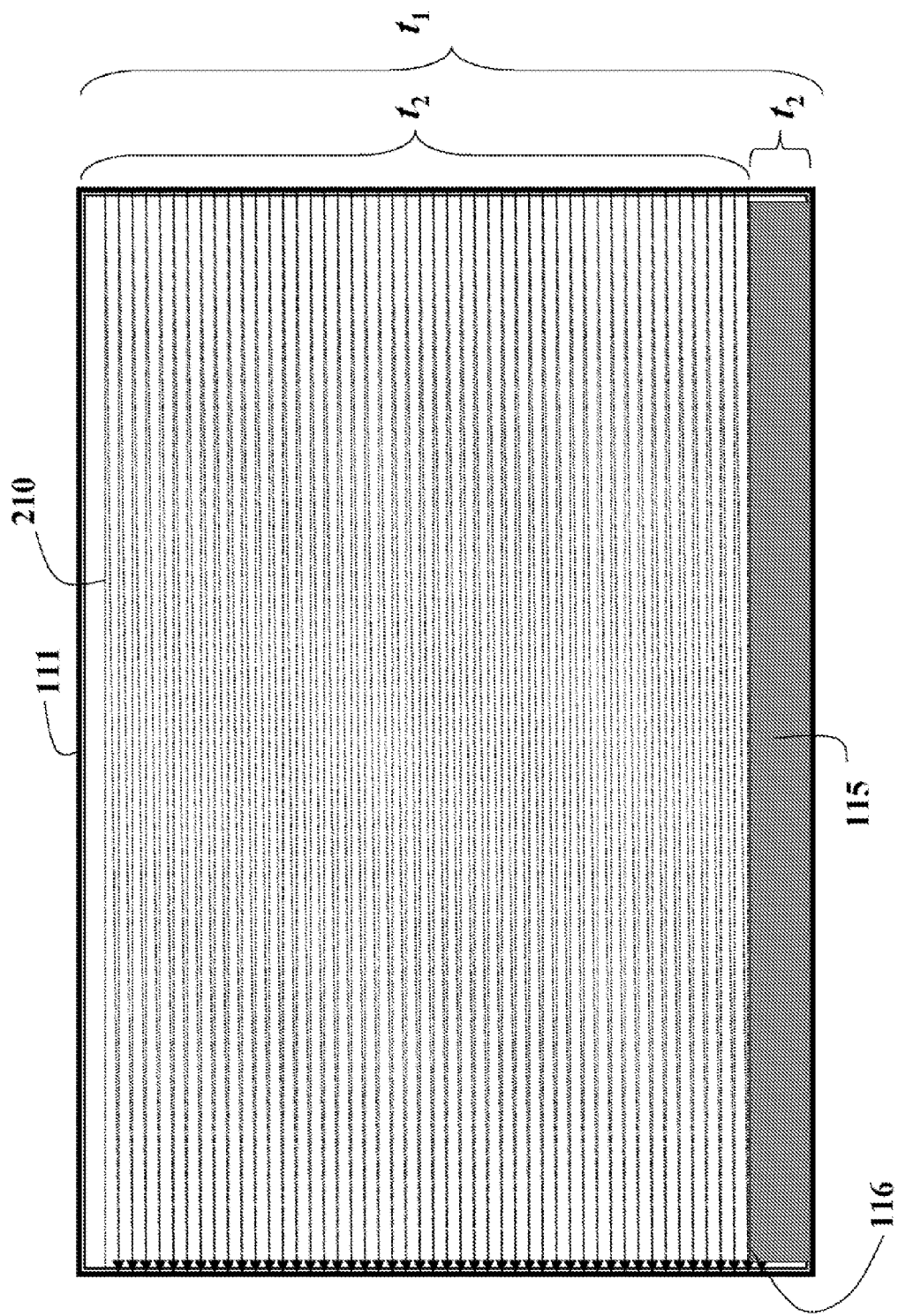
FIG. 2B is a block diagram of a rasterized output image according to an embodiment of the invention.

As shown in FIG. 2B, the projector uses rasterization techniques. In a raster scan, pixels are illuminated along scan lines or rows 210, usually in a top to bottom order. The time required to generate a complete output image 111 is $t_1$. The time during which an input image 121 is acquired is $t_2$. During the time $t_s$, the pixels in the output image are still turned off or black, resulting in a distinguishable stripe 115 with an edge 116. This stripe can be observed in the input image due to the fact that $t_1 > t_2$.

Figure 2C:
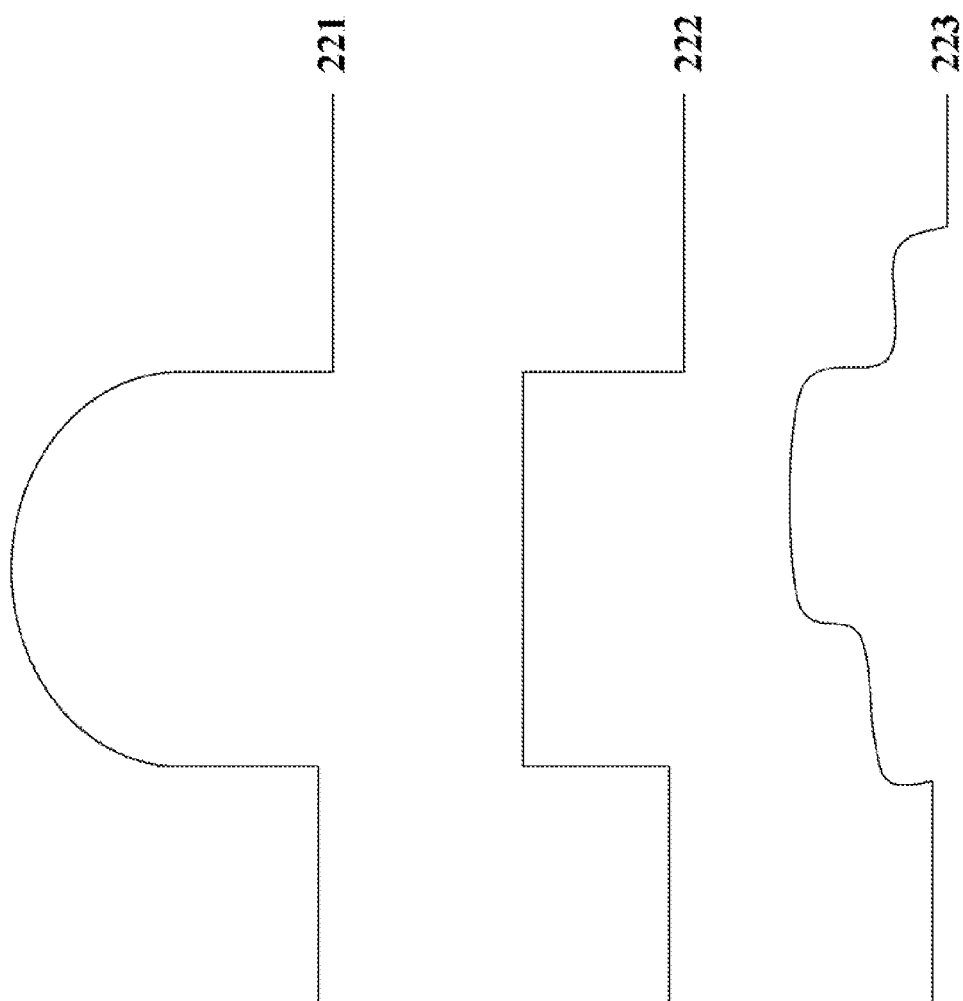
FIG. 2C are surface geometry profiles as acquired by the embodiment of the invention.

If the output image is projected onto an irregular surface, the edge 116 forms a 2D profile 117 of the surface as shown more clearly in FIG. 2C, for example, edge profiles 221-223 correspond respectively to a ball, block, and toy car on the surface 105. The distance d 118 that the profile differs from a straight line yields the surface contour. The edges can be detected to measure 230 the distortion using conventional edge techniques. It should be understood, that the profiles can be distorted due to the angles between the projector, camera and surface. Thus, the output image, as a tangible useful result represents the surface geometry. The output image can be displayed or further processed.

If the rates $R_1$ and $R_2$ are different, the stripe, as observed in the input images 121 will appear to move across tire surface so that a 3D geometry of the surface structure of the scene can be obtained.

FIGS. 3A-3D shows this effect. FIG. 3A shows an empty scene with a projected all-white image with a first rate $R_1$ of, e.g., 30 Hz as seen by the user. FIG. 2B shows the scene as observer by the camera with a second rate $R_2$ of, e.g., 29 Hz. The dark horizontal stripe 115 is clearly seen in the image acquired by the camera. The black stripe is due to the shutter of the camera being open for an amount of time $t_2$, which is slightly shorter than the ⅓₀ sec time $t_1$ necessary to project the entire output image. Thus, the distinguishable stripe 115 is the portion of the output image that cannot be acquired by the camera, i.e., all the pixels in the stripe have zero intensity.

FIG. 3C shows the scene with the hand 150 as seen by the user. Note that the stripe is not visible to the user. FIG. 3D shows the scene as observed by the camera with a frame rate of 29. During a sequence of image, the stripe appears to roll up or down, in effect 'scanning' the entire scene or remains still, as dictated by the relationship of two frame rates $R_1$ and $R_2$.

This effect can also be observed by any camera acquiring images projected by any rasterizing projector into the scene. However, unlike in the planar display surface, such as a TV screen, the projected output image is distorted by the geometry of the scene. Because the aliasing effect always generates a straight edge, any distortions d 118 in the part of the obscured edge 117 observed by the camera is due to the 3D geometry of the scene. Thus, our invention mimics a structured light pattern without actually using a structured light pattern. Because this aliasing effect can only be observed by a discrete sampling device or a device with a small discrete light integration mechanism such as a camera with a shutter (mechanical or electronic), the human eye cannot see this effect. Therefore, the user does not observe the structured light pattern, which is only present in the input images. Thus, the output images can be arbitrary, and more advantageously contain content that is useful to the observer, unlike prior art structured light systems.

FIGS. 4A-4D show the timing diagrams with an aliasing effect, in which the axes correspond to the vertical and horizontal scan signals. In the Figures, the sawtooth raster signal 401 is generated by the projector, and the square signal 402 is generated at the camera. Note that the signals 'creep' with respect to each, other over time, which causes the stripe in the input images to scroll up or down.

The sawtooth signal traverses the height of the projected output image once for every output image. An increase in the signal results in increased deflection of the scanning ray until the ray reaches the bottom of the image. Then, the reversal jump in the signal re-positions the ray to the initial scanning position for the next image. During the vertical scan, the horizontal scan signal moves the ray horizontally, i.e., once per raster scan line, while the intensity of the horizontal scan signal is modulated by the intensity value of the pixel at the corresponding image location.

The square wave signal corresponds to a camera shutter control signal. The camera integrates the light coming into the imaging sensor over the period of time during which the shutter is open. Therefore, if the shutter is kept open for the duration of the projector image scan signal, then the entire projected output image is acquired by the camera. However, if the shutter is only open during a part of the scan, then the output image acquired by the camera sensor has a portion that is smaller than the entire output image. The remaining portion that is not acquired appears as the black stripe 115, i.e., pixels with zero intensity values.

FIGS. 4A-4D show this effect for a projector with a refresh rate of 30 fps, and different: values for tire camera frame rate and shutter speed (duty cycle). It can be seen that using the shutter control signal, at 80% duty cycle allows about 80% of the projected image to be acquired in a single camera input image. However, due to the difference in the projector refresh rate and the camera frame rates, each, subsequent input image has a 20% gap shifted by a small amount, allowing for an effective "scanning" of the scene, which results in the black stripe 201, as shown in FIGS. 3B and 3D.

Figure 4A:
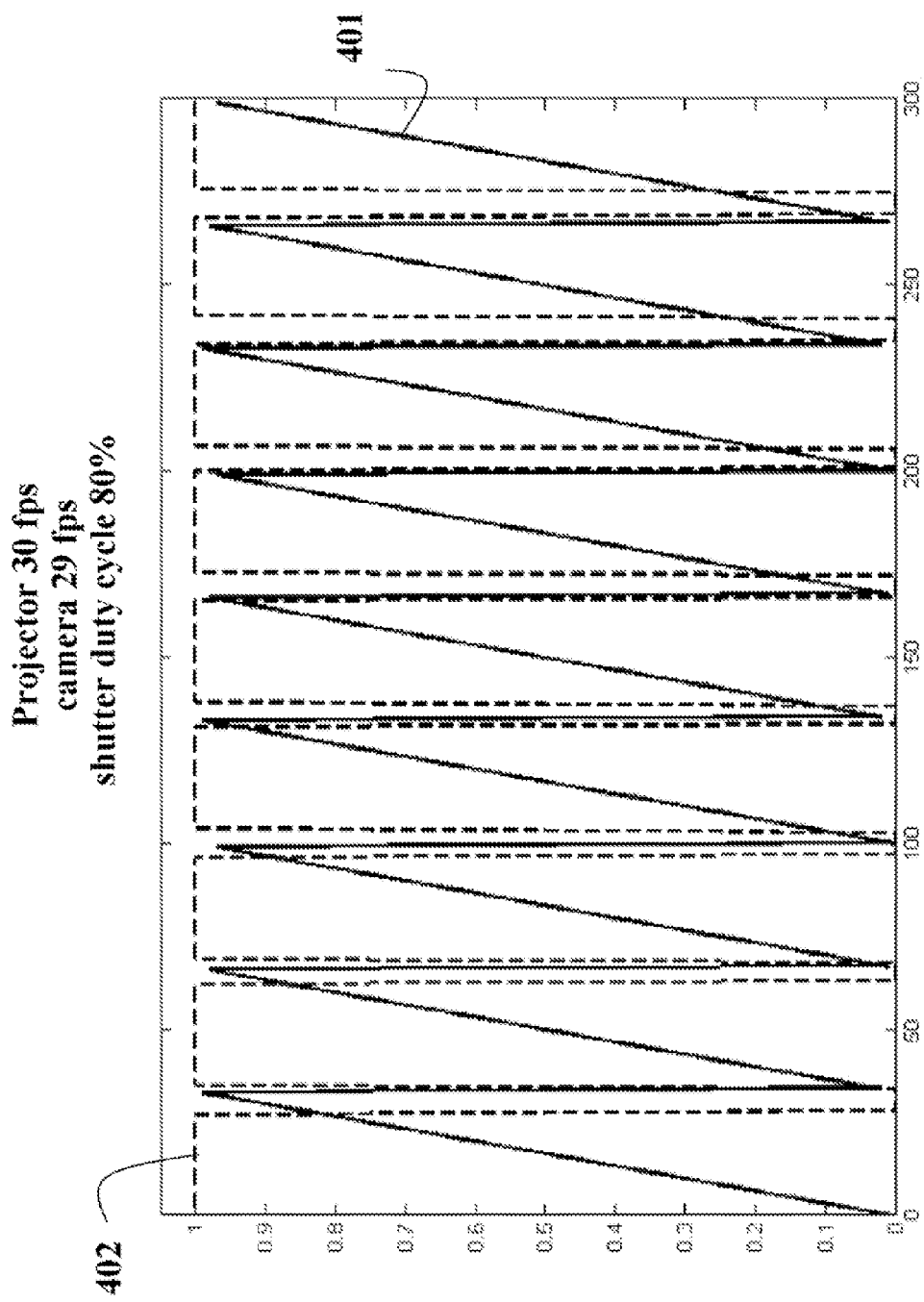
FIGS. 4A-4D are timing diagrams of refresh rates and frame rates of the system of FIG. 1.
Figure 4B:
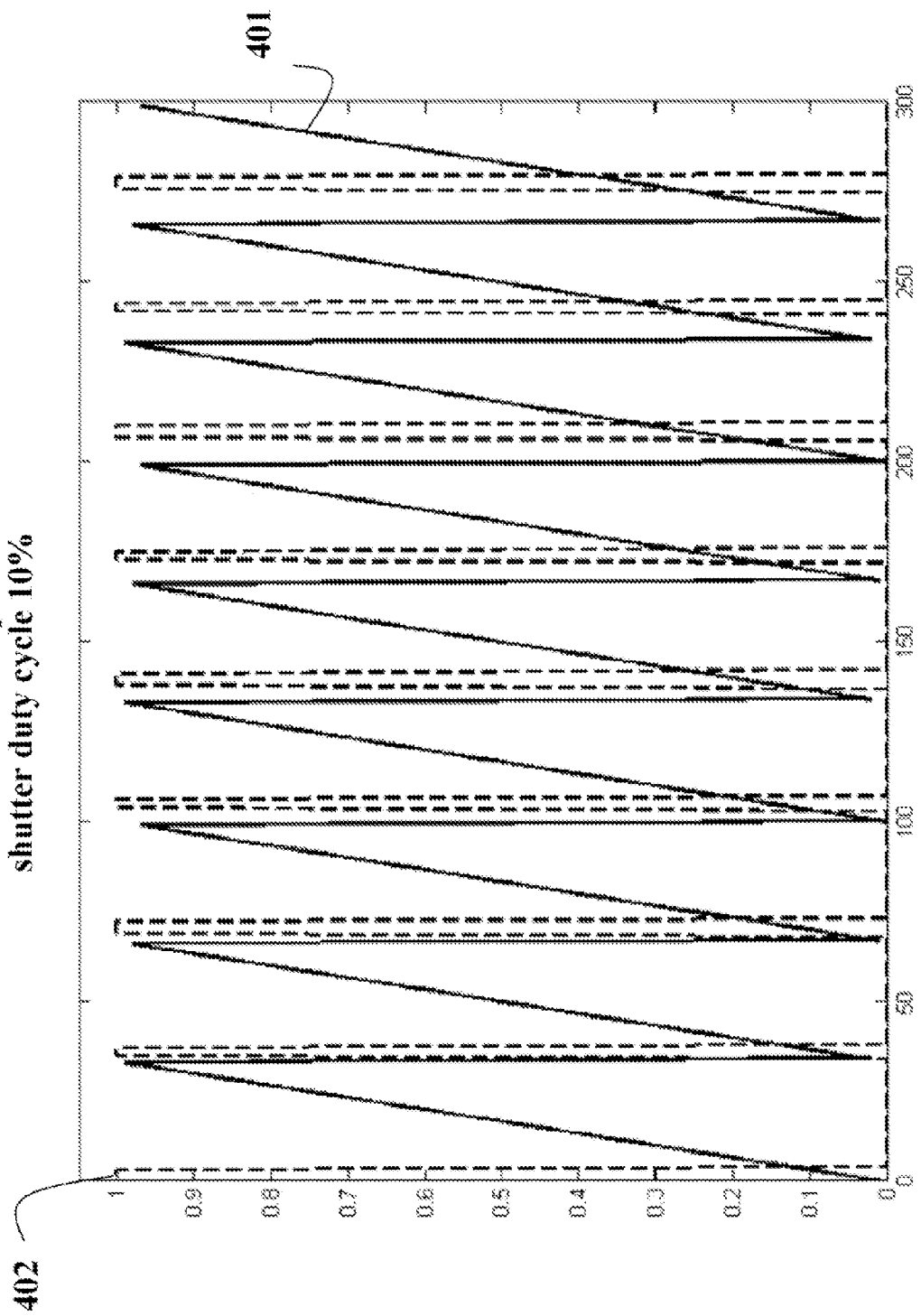

Instead of using a wide dark stripe, we can produce a narrow stripe in the input image if the duty cycle of the shutter control signal is selected to be small, e.g., 10% as shown in FIG. 4B. Thus, the width of the stripe can be made adjustable.

Figure 4C:
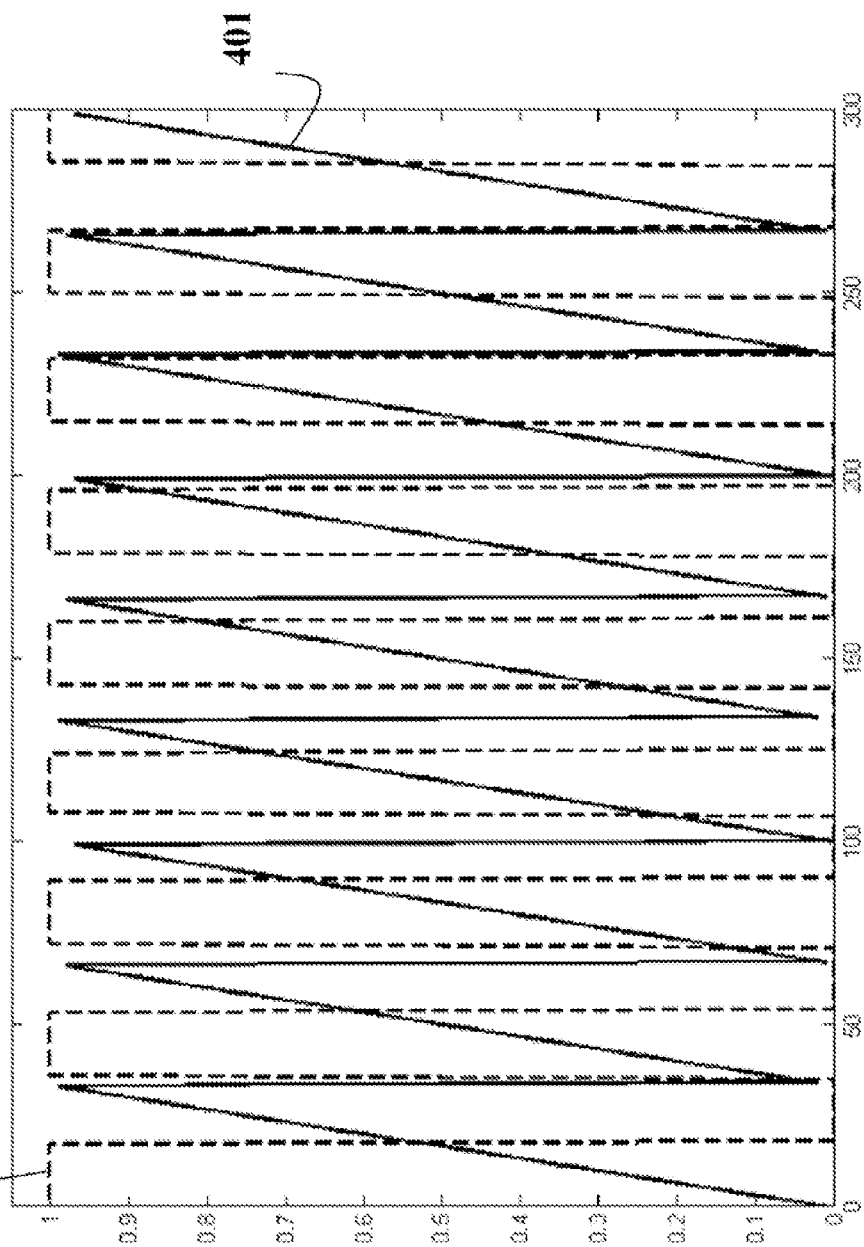
Figure 4D:
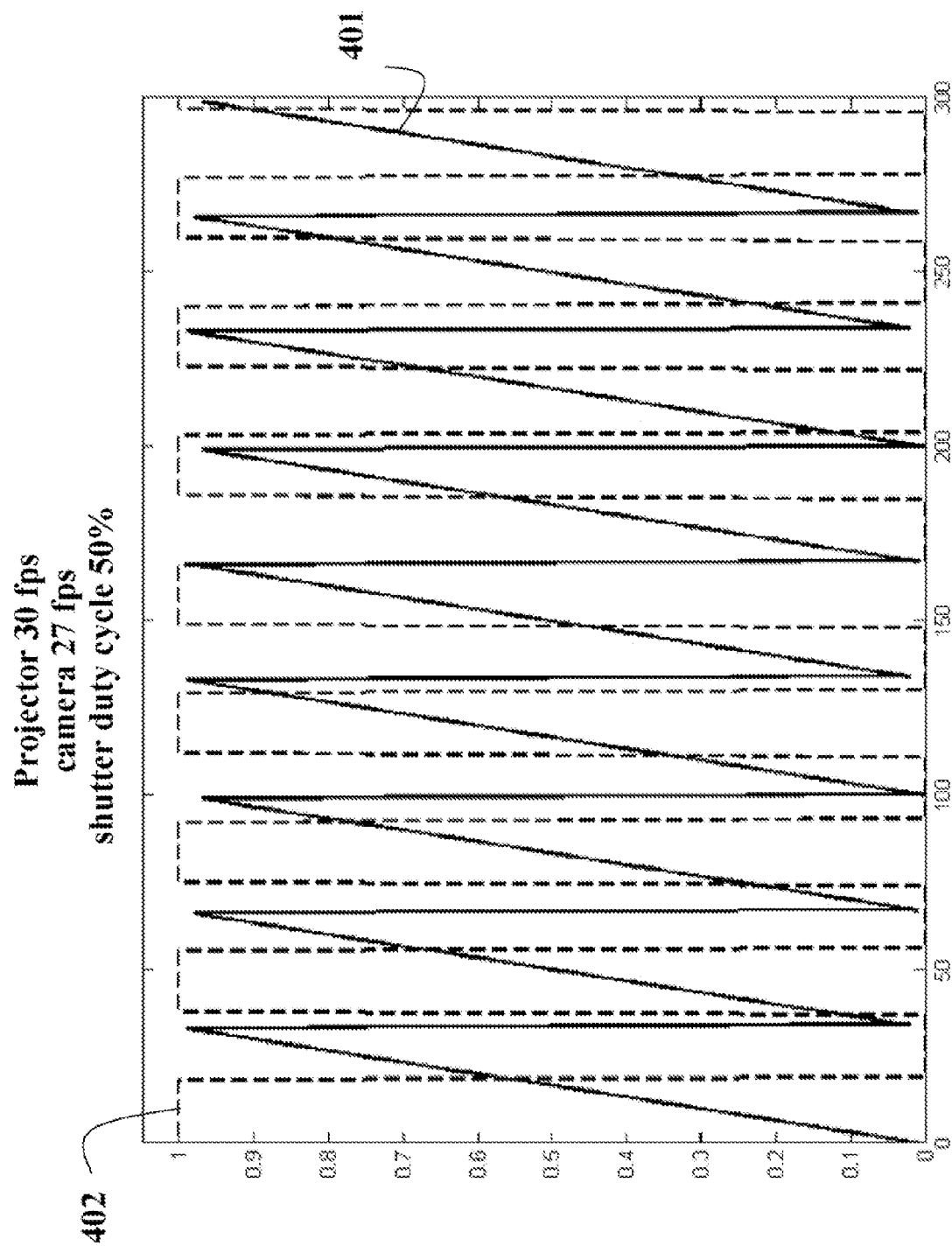

By varying the difference between the projector refresh rate and the camera frame rate, the scanning stripe can be made to move faster or slower across the scene. Thus, a speed at which the strip moves can also be made adjustable. This results in faster and coarse sampling, or slower and fine sampling of the 3D scene 101. FIGS. 4C and 4D show the effect of setting the shutter duty cycle at 50%, which allows for exactly half of the projected image to be taken by the dark stripe, which enables the spacing of the stripe edges to be equal.

Because the performance of the method has tradeoff between the speed of scanning and spatial resolution, it is desirable to increase the number of "stripes" in the input images. Indeed, we scan P distinct positions in the scene. That can be achieved after P/2, i.e., two edges, are acquired. That, cannot be done faster than $$T_s = \frac{P}{2F_s}$$

seconds, where $F_s$ is the camera frame rate and $T_s$ is the scan time.

In order to circumvent this limitation, the following technique can be used. This technique is applicable to CCD camera sensor, but also to other sensors, such as CMOS sensors, where individual row addressing is available. Instead of a linear scanning pattern, a field-based imaging scheme can be provided, which can be used to partition the single wide stripe into a set of narrower stripes, equally distributed across the input images. If instead of using the single stripe, we use $N_f$ stripes, where $N_f$ is a striping factor, then the efficiency of the scanning scheme can be increased by the same factor to result in a maximum scanning rate of $$T_s = \frac{P}{2F_s N_f}$$

seconds per frame.

It is also possible to achieve the effect of generating multiple stripes at a time with CCD cameras by allowing the shutter to be open several times during the frame integration time (time required by the camera to acquire a single frame), This will result in several dark and bright stripes in the input image of the camera without impairing the output image quality to the user.

Because these non-linear scanning pattern afford a complete, albeit low-fidelity 3D scan from a single captured image, it is possible for certain applications to synchronize the frame rate of the camera and the frame rate of the projector, so that the measurements remain fixed in the environment, rather than scanning over the scene. It is also possible to modify the pattern of line control to dynamically concentrate these measurements on application-specific elements in the scene such as projected user interface elements, or important portions of the physical, scene such the area near the finger.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a geometry of a scene, comprising:
    projecting an output image into a scene, in which a time to project the output image is $t_1$;
    acquiring, while projecting the output image, an input image of the scene, in which a time to acquire the input image is $t_2$, and in which $t_1 > t_2$, and in which the input image includes a distinguishable stripe of pixels with an edge due to $t_1 > t_2$; and
    measuring, in the input image, an amount of distortion d of the edge of the stripe from a straight line to determine a geometry of the scene, wherein the steps are performed in a processor.

2. The method of claim 1, further comprising:
    projecting a sequence of output image while acquiring a sequence of input images.

3. The method of claim 2, in which a rate of projecting is different than a rate of acquiring so that the stripe appears to move in the sequence of input images.

4. The method of claim 2, in which a speed at which the stripe moves is adjustable.

5. The method of claim 1, in which the output image is arbitrary.

6. The method of claim 1, in which the output image is unstructured.

7. The method of claim 1, in which the scene includes a hand of a user interacting with the output image.

8. The method of claim 1, in which the amount of distorting corresponds to the 3D geometry of the scene.

9. The method of claim 1, in which the acquiring is subject to a duty cycle of a camera, in which a shutter of the camera is open for a discrete amount of time that is smaller than a time required to project the output image.

10. The method of claim 1, in which the input image includes multiple stripes.

11. The method of claim 10, in which the stripes are dynamically positioned to preferentially measure distortion in parts of the scene.

12. The method of claim 1, in which a width of the stripe is adjustable.

13. The method of claim 1, in which the geometry is a 2D profile of the scene.

14. The method of claim 1, in which the geometry is a 3D structure of the scene.

15. The method of claim 1, in which the projection uses a rasterization technique.

16. The method of claim 1, in which an integration of the input image is intermittent while acquiring the input image.

17. The method of claim 1, in which the projecting and acquiring are performed by a projector and camera arranged in a handheld device.

18. The method of claim 17, in which the handheld device is a mobile telephone.

19. The method of claim 1, in which the output images are part of a computer graphic presentation.

20. The method of claim 1, in which the output images are part of a computer game.

* * * * *